United States Patent
Flammer, III

(10) Patent No.: US 8,606,258 B2
(45) Date of Patent: Dec. 10, 2013

(54) SYSTEM AND METHOD FOR INTEGRATED METROLOGY WITHIN A FEMTOCELL ACCESS POINT

(75) Inventor: George H. Flammer, III, Cupertino, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 84 days.

(21) Appl. No.: 13/334,019

(22) Filed: Dec. 21, 2011

(65) Prior Publication Data

US 2013/0165104 A1    Jun. 27, 2013

(51) Int. Cl.
*H04W 4/00* (2009.01)

(52) U.S. Cl.
USPC ............... 455/422.1; 455/66.1; 455/456.1; 455/404.1; 455/67.7

(58) Field of Classification Search
USPC ............ 455/422.1, 66.1, 456.1, 456.6, 404.1, 455/67.7; 340/362
See application file for complete search history.

(56) References Cited

U.S. PATENT DOCUMENTS

| | | | |
|---|---|---|---|
| 2006/0114114 A1* | 6/2006 | Nakano et al. | 340/632 |
| 2006/0271314 A1 | 11/2006 | Hayes | |
| 2008/0188243 A1* | 8/2008 | Giustina et al. | 455/456.6 |
| 2009/0076748 A1 | 3/2009 | Robertson et al. | |
| 2009/0093246 A1 | 4/2009 | Czaja et al. | |
| 2009/0311987 A1* | 12/2009 | Edge et al. | 455/404.1 |
| 2010/0027694 A1 | 2/2010 | Touboul et al. | |
| 2010/0222006 A1* | 9/2010 | Peisa et al. | 455/67.7 |
| 2011/0201349 A1 | 8/2011 | Castillo et al. | |

OTHER PUBLICATIONS

International Search Report PCT/US12/071021 dated Apr. 19, 2013.

* cited by examiner

*Primary Examiner* — David Q Nguyen
(74) *Attorney, Agent, or Firm* — Patterson & Sheridan, L.L.P.

(57) ABSTRACT

One embodiment of the present invention sets forth a hybrid femtocell device comprising a femtocell access point and a metrology device, such as a commercial power meter. Each hybrid femtocell device is configured to connect to a backhaul network either via a local network connection or via a neighboring hybrid femtocell. A hybrid femtocell device may be advantageously installed in place of a conventional power meter to operate as both a conventional femtocell access point providing cellular coverage for a targeted location, as well as a smart power meter.

14 Claims, 5 Drawing Sheets

SYSTEM AND METHOD FOR INTEGRATED METROLOGY WITHIN A FEMTOCELL ACCESS POINT

BACKGROUND

1. Technical Field

Embodiments of the present invention relate generally to wireless digital communication systems and, more specifically, to a system and method for integrated metrology within a femtocell access point.

2. Description of the Related Art

Increasing subscribership on cellular networks is constantly driving utilization of available bandwidth within a typical cell coverage region for individual cellular access points. Increasing utilization ultimately leads to poor overall cellular wireless performance and reliability. One strategy for accommodating overall increases in wireless utilization is to continually shrink the coverage region of each cellular access point, thereby maintaining a modest utilization for each cellular access point and consistent reliability overall. For this strategy to work, cellular access points need to be deployed in densities corresponding to local subscribership densities. Furthermore, each cell coverage region should not overlap extensively with more than a small number of other cell coverage regions.

In certain settings, the strategy of deploying cellular access points having small coverage regions is practical. For example, this strategy may be efficiently deployed in areas of consistently dense subscribership and readily available spaces to install cellular access points. However, in other settings this approach becomes very challenging, such as in areas having a mix of high and low subscribership density. For example, a town may have a mix of dense apartments and industrial buildings, as well as large open spaces. A cellular access point with a sufficiently large coverage region to cover the large open spaces would easily be saturated by a few nearby densely populated buildings. However, providing coverage in the large open spaces may also be problematic using small coverage regions without appropriate facility space to install a large number of cellular access points. Equally problematic is providing cellular coverage in extremely sparsely populated locations, such as rural homes and farms.

As the foregoing illustrates, what is needed in the art is a more efficient and economical system and method for providing cellular wireless coverage.

SUMMARY

One embodiment of the present invention sets forth a device configured to monitor and measure power consumption. The device includes a processing unit, at least one communications subsystem for transmitting or receiving wireless communications, a power subsystem, and a metrology subsystem configured to monitor and measure power consumed in an environment external and proximate to the system.

One advantage of the disclosed device is that each hybrid femtocell may be advantageously located in place of a conventional power meter to operate as both a conventional femtocell access point providing cellular coverage for a targeted location, as well as a smart power meter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
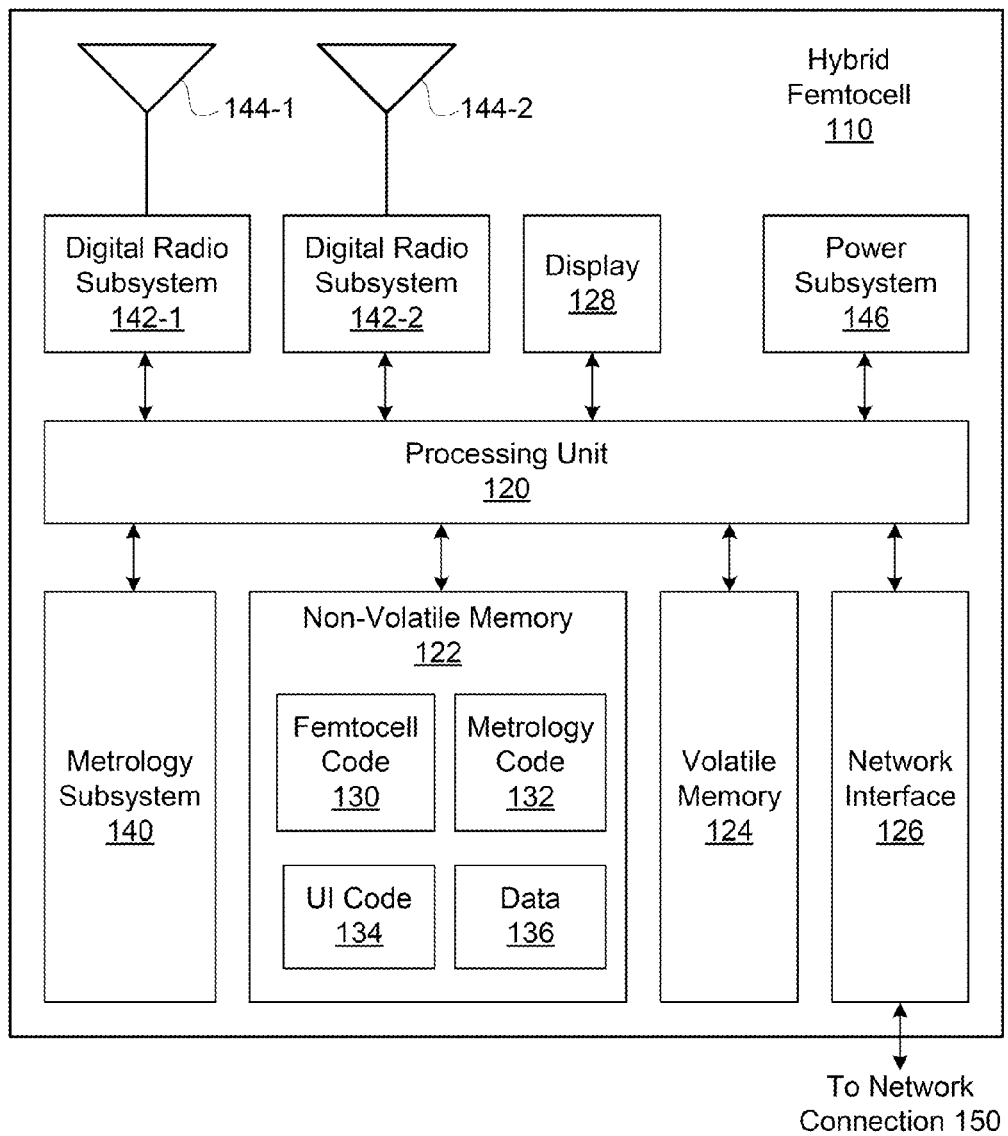
FIG. 1A illustrates a hybrid femtocell, configured to implement one or more aspects of the present invention.

FIG. 1A illustrates a hybrid femtocell 110, configured to implement one or more aspects of the present invention. Hybrid femtocell 110 comprises a processing unit 120, a non-volatile memory 122, a volatile memory 124, a metrology subsystem 140, a network interface 126, a power subsystem 146, and at least one digital radio subsystem 142 coupled to a corresponding antenna 144. The Hybrid femtocell 110 may also include a display 128.

Processing unit 120 includes a processor core configured to retrieve and execute programming instructions from non-volatile memory 122. During the course of executing the programming instructions, the processor core may also store and retrieve data residing within the volatile memory 124. In one embodiment, non-volatile memory 122 includes three software modules including femtocell code 130, metrology code 132, and user interface code 134. Non-volatile memory 122 may also include data 136, such as metrology data. The metrology data may include current and historical data, such as a recent history of power consumption, total power consumption, and total power consumption accrued subsequent to a previous billing cycle.

Femtocell code 130 includes programming instructions for configuring and operating digital radio subsystem 142-1 as a cellular femtocell. Alternatively, femtocell code 130 may include programming instructions for configuring digital radio subsystem 142-1 to operate as a femtocell receiver while configuring digital radio subsystem 142-2 to operate as a femtocell transmitter. Femtocell code 130 may implement any technically feasible techniques for configuring and operating digital radio subsystem 142-1 and 142-2 as a femtocell access point. In one embodiment, femtocell code 130 implements at least one of the well-known mobile communications protocols comprising: global system for mobile communication (GSM), third generation universal mobile telecommunications system (3G), 4G, code division multiple access (CDMA), long term evolution (LTE).

Metrology code 132 includes programming instructions for configuring and operating metrology subsystem 140, which comprises circuitry and sensors configured to perform one or more physical measurements, such as voltage, current, power, accumulated power, flow rate, accumulated flow, temperature, humidity, vibration, or any other quantifiable physical value or metric. Metrology subsystem 140 quantizes measured results into a digital value for processing and storage by processing unit 120. In one embodiment, metrology subsystem 140 comprises a power meter for measuring external accumulated utilization of power. The metrology subsystem 140 monitors utilization to measure, for example, an accumulated kilowatt hour consumption figure.

In certain embodiments, the metrology subsystem 140 monitors and organizes consumption based on two or more different time spans during the day. For example, the metrology subsystem 140 may separately measure and report accumulated power consumption during peak rate hours, and off peak rate hours.

User interface (UI) code 134 includes programming instructions for interacting with a user, such as via display unit 128. In one embodiment, metrology subsystem 140 is configured to measure instantaneous power and accumulated power consumption and UI code 134 is configured to display the instantaneous and the accumulated power consumption via display unit 128.

Network interface 126 includes circuitry for communicating with a network connection 150. The network interface 126 may be configured to communicate via well-known standards including wired Ethernet, IEEE 802.11 (Wifi), IEEE 802.16 (WiMAX), Bluetooth, long term evolution (LTE), or any other technically feasible broadband communications technologies. In one embodiment, the network interface 126 is configured to provide a backhaul communications link to a cellular service provider, enabling hybrid femtocell 110 to place and receive phone calls via a broader public telephone system. Alternatively, network interface 126 may be configured to communicate to another device, such as a different hybrid femtocell 110, that is configured to provide the backhaul communications link. In such a scenario, the different hybrid femtocell 110 is configured to provide routing functionality to route packets from other femtocells 110 through the backhaul communications link.

Power subsystem 146 comprises regulation and power conversion circuitry configured to provide electrical voltage sources to each circuit and subsystem within hybrid femtocell 110. In one embodiment, power subsystem 146 is configured to convert alternating current (AC) power from a power mains system to low voltage direct current (DC) power suitable for powering circuitry within hybrid femtocell 110. Power subsystem 146 may also include an energy storage source such as a battery for continued operation even if power from the power mains is temporarily unavailable.

Figure 1B:
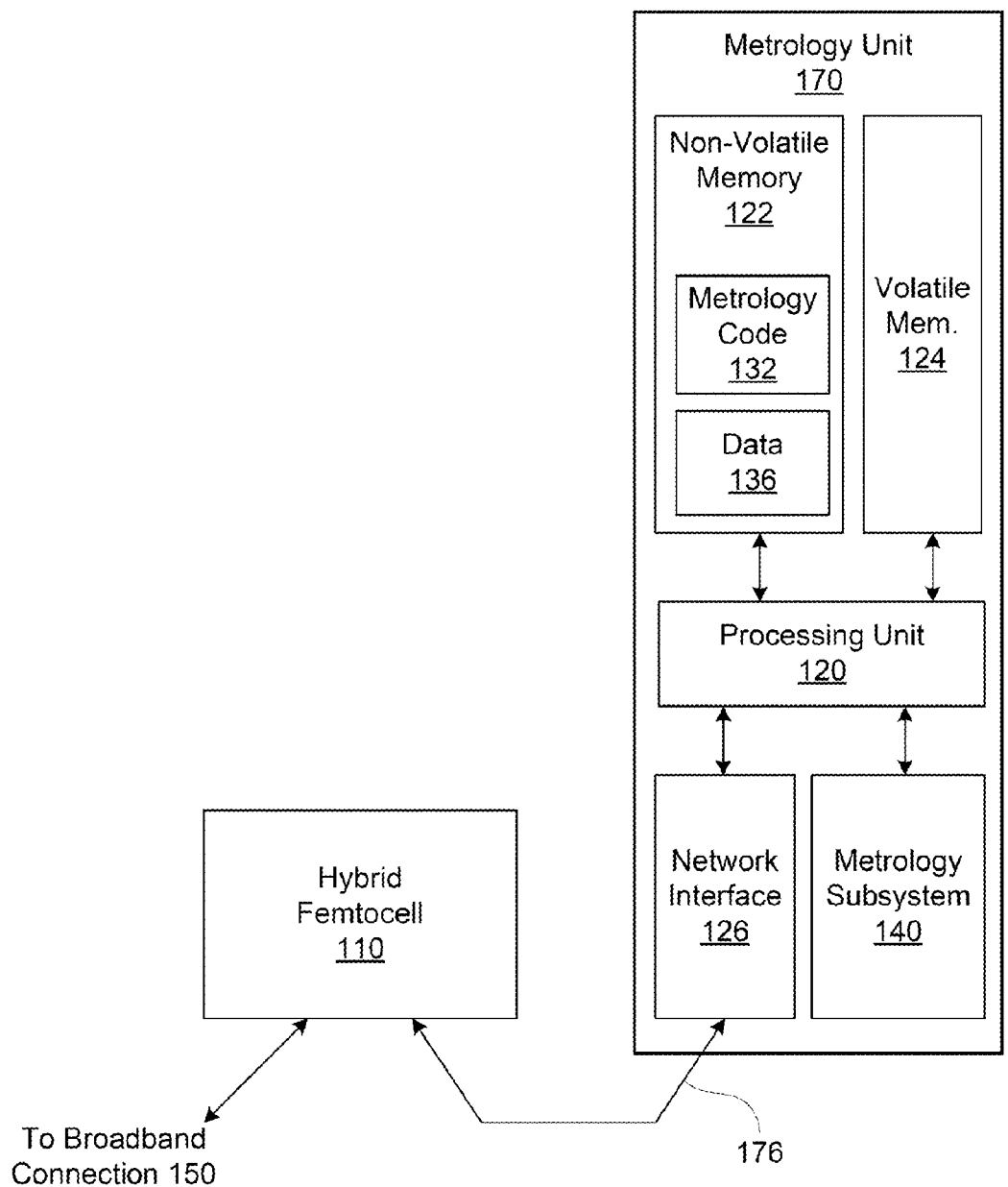
FIG. 1B illustrates a hybrid femtocell coupled to a metrology unit, according to one embodiment of the invention.

FIG. 1B illustrates a hybrid femtocell 110 coupled to a metrology unit 170, according to one embodiment of the invention. In one embodiment, the metrology unit 170 includes a processing unit 120, non-volatile memory 122, volatile memory 124, network interface 126, and metrology subsystem 140, each configured to operate substantially identically to corresponding elements within the hybrid femtocell 110. In one embodiment, metrology subsystem 140 within metrology unit 170 is configured to measure power consumption, including accumulated power consumption and transmit the measured power consumption data to hybrid femtocell 110 via communications link 176. Communications link 176 may implement wired Ethernet, IEEE 802.11 (Wifi), IEEE 802.16 (WiMAX), Bluetooth, long term evolution (LTE), or any other technically feasible communications technologies.

Figure 1C:
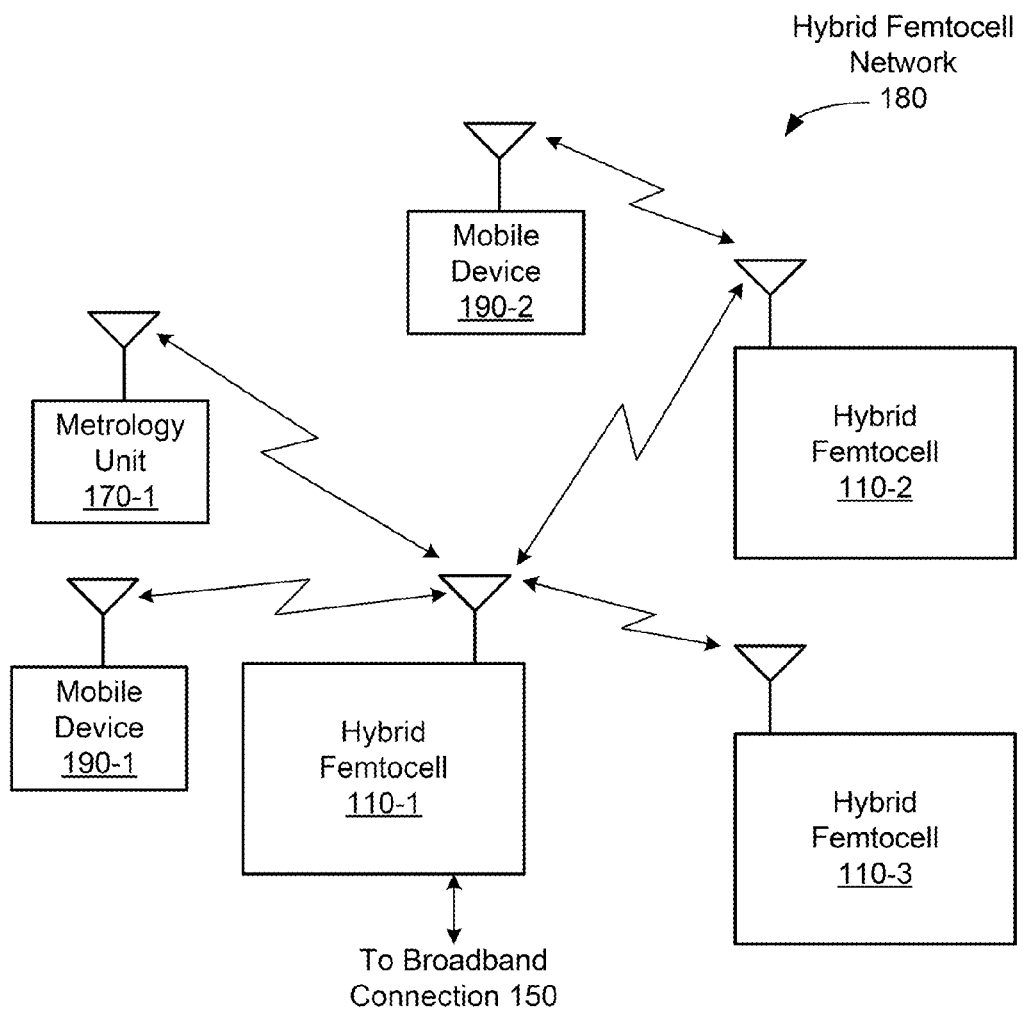
FIG. 1C illustrates a hybrid femtocell network, according to one embodiment of the invention.

FIG. 1C illustrates a hybrid femtocell network 180, according to one embodiment of the invention. The hybrid femtocell network 180 includes at least one hybrid femtocell 110-1 coupled to broadband connection 150. Other hybrid femtocells 110-2 and 110-3 are configured to communication with hybrid femtocell 110-1 and to route data to the broadband connection 150 via hybrid femtocell 110-1. Mobile device 190-1 is configured to operate as a femtocell client to a femtocell presented by hybrid femtocell 110-1. If the mobile device 190-1 is a cell phone handset, then a call may be placed by routing voice data via the broadband connection 150. Similarly, mobile device 190-2 is configured to operate as a femtocell client to a femtocell presented by hybrid femtocell 110-2. In one embodiment, the mobile device 190-2 is a cell phone handset configured to place a voice call by routing digitized voice data via hybrid femtocell 110-1 to the broadband connection 150. From the broadband connection 150, the digitized voice data may be transmitted to a conventional telephone carrier voice service gateway.

In addition to providing femtocell coverage for mobile devices 190, each hybrid femtocell 110 is configured to perform metrology operations, such as measuring accumulated power consumption. In one embodiment, the hybrid femtocell 110 is configured to be installed and operated in place of a residential or commercial power meter. In such embodiments, the hybrid femtocell is disposed in line between a utility power connection and a consumer of the utility power to facilitate power measurement.

Figure 2:
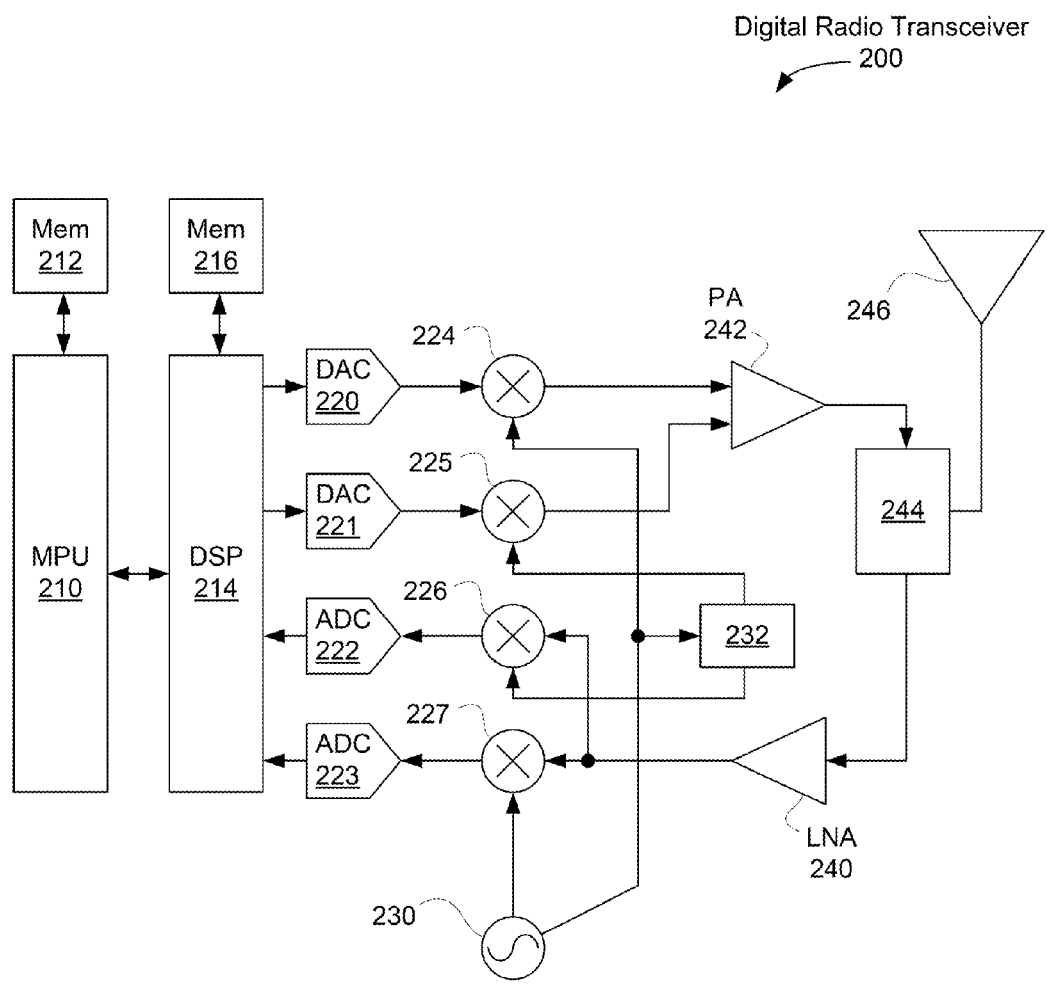
FIG. 2 illustrates a digital radio transceiver configured to implement one or more aspects of the present invention.

FIG. 2 illustrates a digital radio transceiver 200 configured to implement one or more aspects of the present invention. In one embodiment, digital radio transceiver 200 implements digital radio subsystem 142 of FIG. 1A. In another embodiment, digital radio transceiver 200 implements digital radio subsystem 142, MPU 210 implements processing unit 120, and memory 212 implements one or both of non-volatile memory 124 and volatile memory 124.

The digital radio transceiver 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage.

In one embodiment, the MPU 210 implements procedures for processing IP packets transmitted or received as payload data by the digital radio transceiver 200. The procedures for processing the IP packets may include, without limitation, wireless routing, encryption, authentication, protocol translation, and routing between and among different wireless and wired network ports.

The DSP 214 implements signal processing procedures for modulating a serialized representation of payload data comprising packets, such as IP packets, for wireless transmission. The serialized representation may encode one or more bits of payload data per modulation symbol or less than one bit per modulation symbol. A receiver may demodulate each modulation symbol to recover the one or more bits of payload data. In one embodiment the one or more bits of payload data are used to generate a corresponding IP packet.

The DSP 214 may also implement multi-channel modulation for simultaneous transmission of independent units of payload data via multiple, independent channels. Each independent channel occupies a different frequency range in a frequency domain representation of a transmitted radio signal. The DSP 214 also implements signal processing procedures for receiving payload data. The procedures may include, without limitation filtering, energy detection, signal characterization, and simultaneous demodulation of multiple, independent channels.

In one embodiment, the DSP 214 is configured to modulate data within a given channel using a particular modulation technique that is selected form a set of different modulation techniques, based on prevailing channel requirements. For a given packet of data, a particular transmission bit rate may be implemented using one of the different modulation techniques, based on channel conditions. For example, if a selected channel is subjected to a relatively large amount of noise, then a lower bit rate modulation technique that is more tolerant of noise may be selected. Alternatively, if a selected channel is subjected to relatively low noise and low loss, then a higher bit rate modulation technique may be selected despite a potentially reduced noise tolerance. Exemplary modulation techniques known in the art include, without limitation, frequency shift keying (FSK) and quadrature amplitude modulation (QAM). FSK may be implemented as a robust, but relatively low bit rate technique for representing one or more bits of data per modulation symbol as signal energy in at least one of two or more defined frequency bands. QAM may be implemented as a relatively high bit rate technique for representing a set of two or more bits per modulation symbol within an amplitude-phase space. Each possible value represented by the two or more bits is mapped to a unique region within the amplitude-phase space. A collection of regions within the amplitude-phase space is known as a constellation. During modulation, each set of two or more bits comprising a modulation symbol is encoded and mapped to an appropriate region within a corresponding constellation. Persons skilled in the art will understand that quadrature encoded signal pairs may be used to conveniently implement QAM modulation. Furthermore, any technically feasible modulation, demodulation, filtering, energy detection, and signal characterization techniques may be implemented by the DSP 214 without departing the scope and spirit of embodiments of the present invention.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, the DSP 214 generates two modulated streams of outbound digital values, which are converted to corresponding analog quadrature signals by DACs 220, 221. The analog quadrature signals are separately mixed with a radio frequency (RF) carrier signal by analog mixers 224, 225 to generate corresponding quadrature RF signals, each having a frequency domain image centered about the frequency of the RF carrier signal. Oscillator 230 generates the RF carrier signal and phase shifter 232 generates a 90-degree shifted representation of the RF carrier signal for generating quadrature RF signals. The PA 242 combines the quadrature RF signals to generate a modulated RF signal, which is coupled through the antenna switch 244 to the antenna 246. The antenna 246 converts the modulated RF signal from an electrical representation to an electromagnetic representation for wireless transmission. The wireless transmission may be directed to a different instance of the digital radio transceiver 200, residing within a different node of the wireless mesh network 102.

When the digital radio transceiver 200 is receiving data, the antenna 246 converts an incoming electromagnetic RF signal to an electrical RF signal, which is coupled through the antenna switch 244 to the LNA 240. The LNA 240 amplifies the electrical RF signal and couples the amplified RF signal to analog mixers 226 and 227. The amplified RF signal is characterized as having a signal image centered about an RF carrier frequency. The analog mixer 227 shifts the signal image down in frequency to an in-phase baseband component of the signal image. The signal is in-phase with respect to the RF carrier signal generated by oscillator 230. The analog mixer 226 shifts the signal image down in frequency to a 90-degree shifted baseband component of the signal image. The in-phase and 90-degree shifted baseband signals comprise a quadrature representation of one or more channels within the electrical RF signal. A plurality of different frequency channels may be represented within the baseband signals. The DSP 214 is configured to map the stream of inbound digital values, comprising a time domain representation of the baseband signals, to a frequency domain representation of the baseband signals. Persons skilled in the art will recognize that the frequency domain representation may be used to efficiently isolate one data bearing signal within one channel from a signal within a different channel. Similarly, the frequency domain representation may be used to detect noise and interfering transmissions within a given channel.

In one embodiment, the oscillator 230 can be programmed to generate one selected frequency from a plurality of possible frequencies. Each of the plurality of frequencies corresponds to a different channel. The selected frequency determines a center channel for a range of channels that are concurrently available to the DSP 214 or receiving or transmitting data. For example, if a frequency range of 5 MHz defines fifty channels, and each channel is allocated a bandwidth of 100 kHz, then the selected frequency determines a center channel for five concurrently available channels that are adjacent in frequency. In this example, a frequency range of 500 kHz from the overall frequency range of 5 Mhz is processed by the DSP 214 for transmitting or receiving data on one or more of the five channels. If the oscillator 230 is programmed to generate a different selected frequency, then a different set of five concurrently available channels may be used for transmitting or receiving data. The center channel may be changed arbitrarily by programming the oscillator 230 independently of the DSP 214 operating on the concurrently available channels. The digital radio transceiver 200 may be configured with an arbitrary number of concurrently available channels, each having an arbitrary bandwidth without departing the scope and spirit of embodiments of the present invention.

Figure 3:
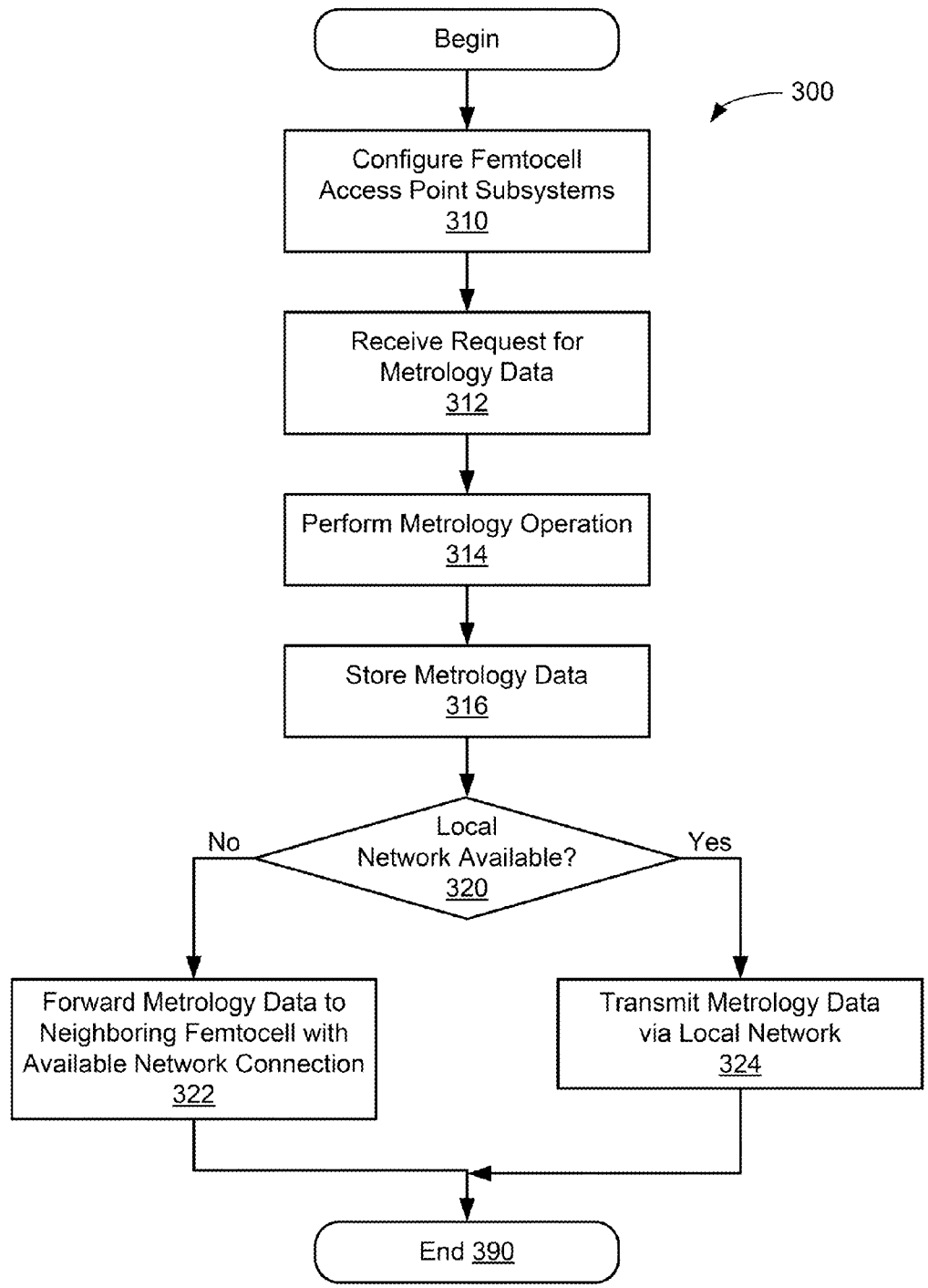
FIG. 3 is a flow diagram of a method for providing metrology data via a hybrid femtocell, according to one embodiment of the invention.

FIG. 3 is a flow diagram of a method 300 for providing metrology data via a hybrid femtocell 110, according to one embodiment of the invention. Although the method steps are described in conjunction with the systems of FIGS. 1A, 1B, 1C and 2, persons skilled in the art will understand that any system configured to perform the method steps, in any order, is within the scope of the present invention. This method may be performed by hybrid femtocell 110.

The method begins in step 310, where the hybrid femtocell 110 configures femtocell access point subsystems comprising at least digital radio subsystem 142 for operation as a femtocell access point. In one embodiment, a discovery process is also performed to find neighboring hybrid femtocells 110.

In step 312, the hybrid femtocell 110 receives a request from a server system for metrology data. This request may be received via a local network connection or via a neighboring hybrid femtocell. In step 314, the hybrid femtocell 110 performs at least one metrology operation. In one embodiment, the at least one metrology operation comprises performing an accumulated power consumption measurement. In step 316, the hybrid femtocell 110 stores the metrology data to be transmitted back to the server system. If, in step 320 a local network is not available to hybrid femtocell 110, then the method proceeds to step 324, where the hybrid femtocell transmits the metrology data back to the server via the local network connection. Otherwise, if the local network is not available, then the method proceeds to step 322, where the hybrid femtocell 110 forwards the metrology data to a neighboring femtocell having an available network connection. In one embodiment, the neighboring femtocell is discovered in step 310. The method terminates in step 390.

In sum, a technique for providing metrology data via a hybrid femtocell involves performing a metrology operation in response to a server request and transmitting resulting metrology data to the server via either a neighboring hybrid femtocell or via a local network connection.

One advantage of the disclosed systems and methods is that each hybrid femtocell may be advantageously located in place of a conventional power meter to operate as both a conventional femtocell access point providing cellular coverage for a targeted location, as well as a smart power meter.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A device configured to monitor and measure power consumption, comprising:
    a processing unit;
    at least one communications subsystem for transmitting or receiving wireless communications;
    a network interface that couples the device to a broadband network connection, wherein the broadband network connection allows the device to receive data from a mobile device;
    a power subsystem; and a metrology subsystem configured to monitor and measure power consumed in an environment external and proximate to the device,
    wherein the at least one communications subsystem allows the device to receive data from one or more other power monitoring and measuring devices.

2. The device of claim 1, wherein the network interface is configured to transmit via the broadband network connection the data received from the one or more other power monitoring and measuring devices as well as the data received from the cellular device.

3. The device of claim 1, wherein the network interface is configured to transmit via the broadband network connection power consumption data measured by the metrology subsystem.

4. The device of claim 3, wherein the power consumption data comprises accumulated kilowatt hours consumed in the environment external and proximate to the device.

5. The device of claim 4, wherein the power consumption data comprises accumulated kilowatt hours consumed in the environment external and proximate to the device and measured separately during at least two different time periods.

6. The device of claim 1, wherein the data received from the cellular device comprises digitized voice data.

7. A system configured to monitor and measure power consumption, the system comprising:
    a hybrid femtocell device that includes:
        a processing unit,
        at least one communications subsystem for transmitting or receiving wireless communications,
        a network interface that couples the hybrid femtocell device to a broadband network connection, wherein the broadband network connection allows the hybrid femtocell device to receive data from a mobile device,
        a power subsystem,
        a metrology subsystem configured to monitor and measure power consumed in an environment external and proximate to the hybrid femtocell device, and
        a metrology unit configured to communicate with the hybrid femtocell device and to monitor and measure power consumed in a second environment external to and proximate to the metrology unit,
    wherein the at least one communications subsystem allows the hybrid femtocell device to receive data from one or more other hybrid femtocell devices.

8. The system of claim 7, wherein the network interface is configured to transmit via the broadband network connection the data received from the metrology unit as well as the data received from the cellular device.

9. The system of claim 7, wherein the network interface is configured to transmit via the broadband network connection power consumption data measured by the metrology subsystem.

10. The system of claim 9, wherein the power consumption data comprises accumulated kilowatt hours consumed in the environment external and proximate to the hybrid femtocell device.

11. The system of claim 9, wherein the power consumption data comprises accumulated kilowatt hours consumed in the environment external and proximate to the hybrid femtocell device and measured separately during at least two different time periods.

12. The system of claim 7, wherein the data received from the cellular device comprises digitized voice data.

13. A method for transmitting power consumption data that has been monitored and measured by a hybrid femtocell device, the method comprising:

configuring a communications subsystem in the hybrid femtocell device to receive and transmit the power consumption data;
receiving a request for the power consumption data from a service external to the hybrid femtocell device;
determining whether a local network is available for data transmissions; and
forwarding the power consumption data to a second hybrid femtocell device, if the local network is not available; or
transmitting the power consumption date via the local network, if the local network is available.

14. The method of claim 13, further comprising:
performing a metrology operation to measure the power consumption data; and
storing the power consumption data within a memory subsystem, wherein the power consumption data represents at least accumulated kilowatt hours.

\* \* \* \* \*

UNITED STATES PATENT AND TRADEMARK OFFICE
CERTIFICATE OF CORRECTION

PATENT NO. : 8,606,258 B2  
APPLICATION NO. : 13/334019  
DATED : December 10, 2013  
INVENTOR(S) : George H. Flammer, III Page 1 of 1

It is certified that error appears in the above-identified patent and that said Letters Patent is hereby corrected as shown below:

In the Claims:

Column 8, Claim 5, Line 19, please delete "4" and insert --3-- therefor.

Signed and Sealed this
First Day of April, 2014

Michelle K. Lee
*Deputy Director of the United States Patent and Trademark Office*